(12) United States Patent
Horasawa et al.

(10) Patent No.: US 8,187,686 B2
(45) Date of Patent: May 29, 2012

(54) ELASTIC MEMBER FOR INK JET RECORDING APPARATUS, INK JET RECORDING APPARATUS INCLUDING ELASTIC MEMBER, ELASTIC MEMBER FOR INK TANK AND INK TANK INCLUDING ELASTIC MEMBER

(75) Inventors: Akio Horasawa, Matsumoto (JP); Dai Igarashi, Shounai-machi (JP); Nagamitsu Takashima, Okaya (JP); Shinzo Saito, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 12/397,530

(22) Filed: Mar. 4, 2009

(65) Prior Publication Data
US 2010/0068432 A1  Mar. 18, 2010

(30) Foreign Application Priority Data
Mar. 4, 2008 (JP) ................................. 2008-053933

(51) Int. Cl.
- B65D 1/00 (2006.01)
- B32B 1/08 (2006.01)
- C08L 53/00 (2006.01)
- B41J 2/01 (2006.01)

(52) U.S. Cl. ................... 428/35.7; 428/36.8; 428/36.91; 428/36.92; 525/98; 347/1

(58) Field of Classification Search ................. 428/34.1, 428/35.7, 36.8, 36.91, 36.92; 347/84–87, 347/29, 31, 33, 1; 399/102, 103, 105, 106; 525/88–99

See application file for complete search history.

(56) References Cited

U.S. PATENT DOCUMENTS

| 6,334,820 B1 * | 1/2002 | Sasaki ........................... 473/374 |
| 8,021,249 B2 * | 9/2011 | Higuchi et al. ............... 473/384 |
| 2004/0239735 A1 | 12/2004 | Mashita et al. |

FOREIGN PATENT DOCUMENTS

| JP | 2000-000978 A | 1/2000 |
| JP | 2001-225484 A | 8/2001 |
| JP | 2003-094682 A | 4/2003 |
| WO | 03/027183 A1 | 4/2003 |

* cited by examiner

Primary Examiner — Walter B Aughenbaugh
(74) Attorney, Agent, or Firm — Stroock & Stroock & Lavan LLP

(57) ABSTRACT

An elastic member for an ink jet recording apparatus comprising a material containing 100 parts by weight of a block copolymer having a crystalline polyolefin block and an amorphous polyolefin block, 3 to 40 parts by weight of a polyolefin resin and 40 to 250 parts by weight of a softening agent.

11 Claims, 10 Drawing Sheets

ELASTIC MEMBER FOR INK JET RECORDING APPARATUS, INK JET RECORDING APPARATUS INCLUDING ELASTIC MEMBER, ELASTIC MEMBER FOR INK TANK AND INK TANK INCLUDING ELASTIC MEMBER

This application claims the benefit of Japanese Patent Application No. 2008-053933 filed on Mar. 4, 2008 in Japan, and the content of the application is incorporated herein by reference.

BACKGROUND

1. Technical Field

The present invention relates to an elastic member for an ink jet recording apparatus and an ink jet recording apparatus including the elastic member, and an elastic member for an ink tank and an ink tank including the elastic member.

2. Related Art

An ink jet recording apparatus of the related art is constituted in such a manner that an ink jet recording head which ejects ink droplets corresponding to printing signals is mounted on a carriage which reciprocates in a paper width direction of recording paper and that ink is supplied from an external ink tank to the recording head. Such an ink storage container such as the ink tank is constituted in such a manner that it can be detachably mounted on the carriage, taking convenience in handling into consideration in a small-sized recording apparatus.

Such an ink storage container of the related art is constituted in such a manner that a porous material is contained and impregnated with the ink to retain the ink by capillary force, in order to prevent leakage of the ink from the recording head. On the other hand, with the requirement of improving print quality and print speed, the number of nozzle openings of the recording head increases, resulting in a tendency to increase ink consumption per unit of time.

In order to comply with such a tendency, desirably, it is necessary to increase the amount of ink contained in the ink storage container, and in order to increase the amount of ink, it is necessary to increase the volume of the porous material. However, in order to retain the ink by capillary force, the volume must be increased by increasing the base area, because the height, namely the water head, is limited. This causes a problem of increasing the size of the carriage to result in an increase in the size of the recording apparatus.

Of course, it is also conceivable that retention force of the ink is increased by using a porous material having a small average pore size. However, fluid resistance to a flow of the ink increases, so that not only it becomes difficult to stably supply the ink corresponding to ink consumption in the recording head, but also it becomes difficult to surely supply the ink from a region depart from an ink supply port to the recording head. As a result, there is encountered a new problem that the ink in the ink storage container is not used up to cause waste.

In order to solve such problems, JP-A-2003-94682 discloses an ink cartridge for a ink jet recording apparatus of the related art, which comprises a container provided with a lower ink storage chamber, an upper ink storage chamber, an ink supply port for supplying ink to a recording head, an ink suction flow passage connecting the lower ink storage chamber and the upper ink storage chamber, an ink flow passage connecting the ink supply port and the upper ink storage chamber and an air communication portion for communicating the lower ink storage chamber to the air, and a negative pressure generating mechanism contained in the container and disposed in the course of the ink flow passage. According to this ink cartridge of the related art, the ink is supplied to the recording head through the negative pressure generating mechanism, so that pressure fluctuation caused by changes in the amount of ink can be prevented as much as possible. A membrane valve used in the negative pressure generating mechanism has been demanded to improve adhesion of a differential pressure valve storage chamber in which the membrane valve is contained and a membrane valve holding plate to the membrane valve, in order to prevent response variations of the negative pressure generating mechanism to decrease variations in ink supply capacity.

Further, when the ink cartridge is mounted on the carriage, the ink supply port of the ink cartridge is provided with a seal member, and an ink supply needle communicated with the recording head is inserted into a hole of this seal member. Higher adhesion has been demanded between the ink supply needle and the seal member so that no ink leaks from between the ink supply port and the seal member. Furthermore, this seal member has been demanded to have higher core adjustability (to maintain a sealed state even when misalignment occurs between the ink supply needle and the seal member).

SUMMARY

According to some modes of the invention, there is an advantage that an elastic member for an ink jet recording apparatus, which is excellent in ink resistance, adhesion and moldability, and an ink jet recording apparatus including the elastic member, and an elastic member for an ink tank and an ink tank including the elastic member are provided.

According to the invention, there is provided an elastic member for an ink jet recording apparatus comprising a material containing 100 parts by weight of a block copolymer having a crystalline polyolefin block and an amorphous polyolefin block, 3 to 40 parts by weight of a polyolefin resin and 40 to 250 parts by weight of a softening agent.

According to the invention, there is also provided an elastic member for an ink tank comprising a material containing 100 parts by weight of a block copolymer having a crystalline polyolefin block and an amorphous polyolefin block, 3 to 40 parts by weight of a polyolefin resin and 40 to 250 parts by weight of a softening agent.

BRIEF DESCRIPTION OF THE DRAWINGS

The invention will be illustrated with reference to the following drawings, and the same reference numerals refer to the same elements.

DESCRIPTION OF EXAMPLES

Figure 1:
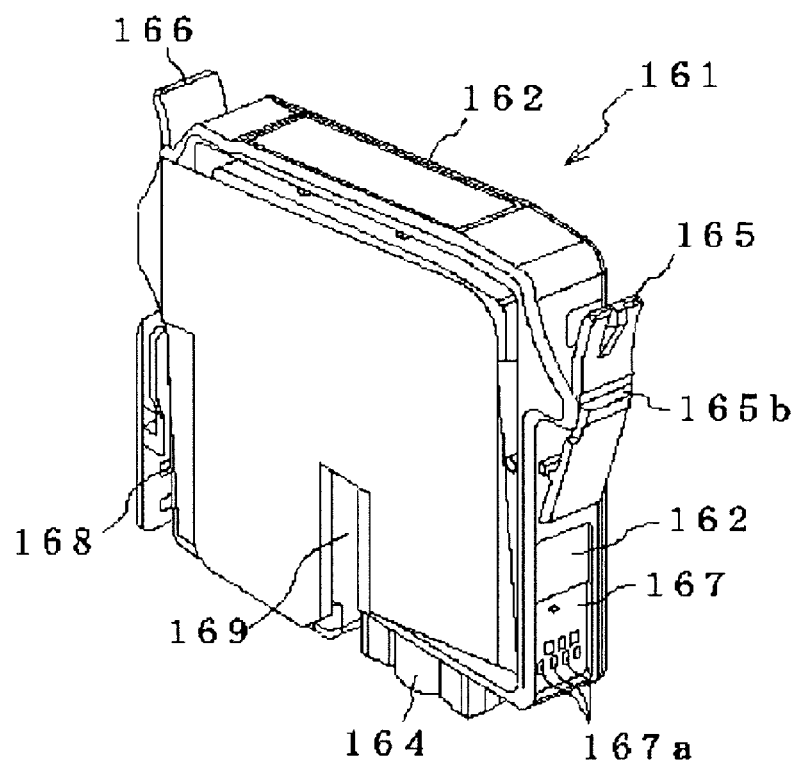
FIGS. 1(a) and 1(b) are perspective views showing an external appearance of front and back sides, respectively, of an ink cartridge according to one embodiment of the invention.
Figure 1:
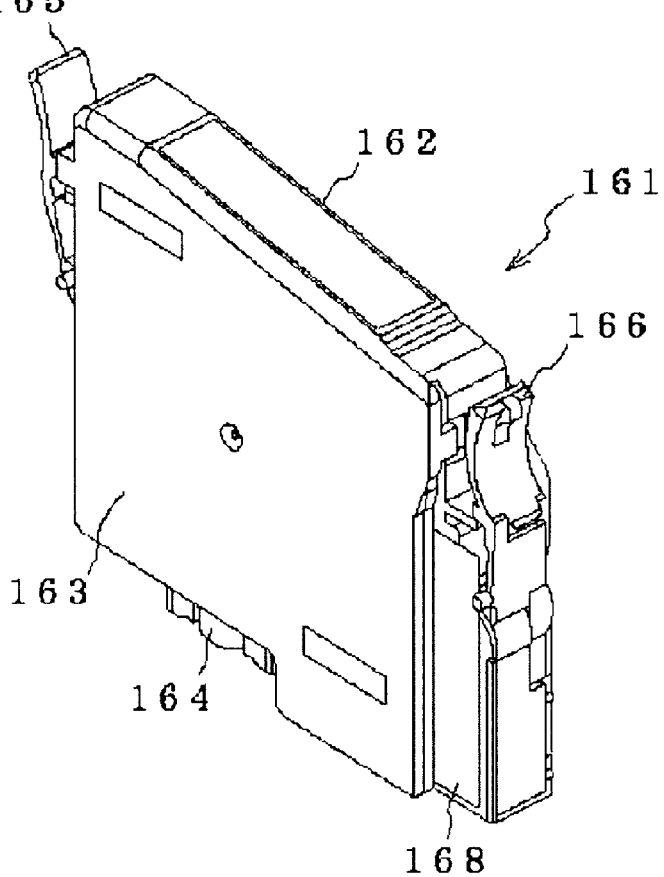
Figure 2:
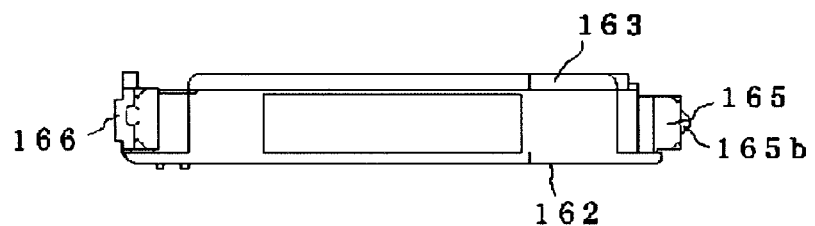
FIGS. 2(a) to 2(d) are an upper surface view, a front view, a bottom surface view and a side view, respectively, of the ink cartridge shown in FIGS. 1(a) and 1(b).
Figure 2:
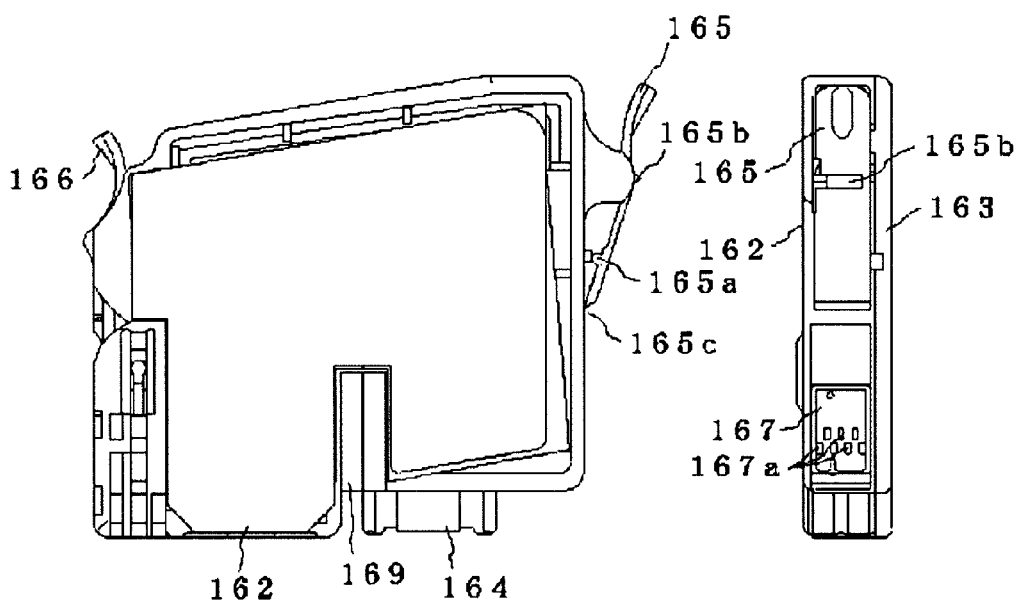
Figure 2:
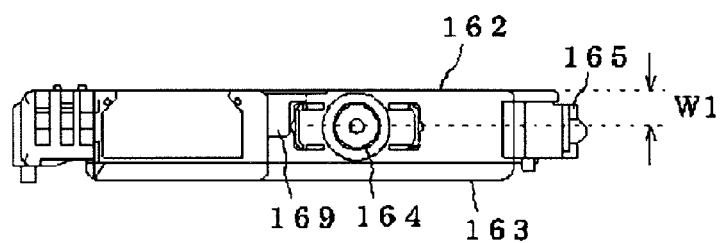

An elastic member for an ink jet recording apparatus and an ink jet recording apparatus including the elastic member, and an elastic member for an ink tank and an ink tank including the elastic member, according to one embodiment of the invention, will be illustrated below with reference to the drawings.

1. Elastic Member for Ink Tank

The elastic member for an ink tank according to this embodiment comprises a material (hereinafter also referred to as a "material for an elastic member") containing 100 parts by weight of a block copolymer having a crystalline polyolefin block and an amorphous polyolefin block, 3 to 40 parts by weight of a polyolefin resin and 40 to 250 parts by weight of a softening agent.

1.1. Material for Elastic Member 1.1.1. Block Copolymer

The crystalline polyolefin block and the amorphous polyolefin block constituting the block copolymer (elastomer) each has one or two or more kinds of olefin blocks.

The crystalline polyolefin block of the block copolymer is preferably a crystalline polyethylene block. Further, the amorphous polyolefin block of the block copolymer is preferably an amorphous polyethylene/butene block.

When the block copolymer contains the crystalline polyethylene block and the amorphous polyethylene/butene block, such a block copolymer can be produced by hydrogenating a copolymer containing a polybutadiene block (i) containing more 1,4-vinyl bonds than 1,2-vinyl bonds and a polybutadiene block (ii) containing more 1,2-vinyl bonds than 1,4-vinyl bonds. By such hydrogenation, the polybutadiene block (i) is converted to the crystalline polyethylene block, and the polybutadiene block (ii) is converted to the amorphous polyethylene/butene block.

Specific examples of the block copolymers include, for example, CEBC. CEBC is a copolymer in which the crystalline polyolefin block is the crystalline polyethylene block, and the amorphous polyolefin block is the amorphous polyethylene/butene block. In this CEBC, the amorphous polyethylene/butene block composed of an ethylene/butene alternate copolymer is arranged in a central portion of a molecule, and the crystalline polyethylene blocks are arranged on both sides of this amorphous polyethylene/butene block. For this reason, CEBC may also be called a (crystalline) polyethylene-(amorphous) polyethylene/butene-(crystalline) polyethylene triblock copolymer.

An elastic member having both of adhesion and moldability and moderate hardness can be obtained by using CEBC as the block copolymer.

CEBC can be produced, for example, by hydrogenating a triblock copolymer containing a polybutadiene block (i) containing more 1,4-vinyl bonds than 1,2-vinyl bonds, a polybutadiene block (ii) containing more 1,2-vinyl bonds than 1,4-vinyl bonds and a polybutadiene block (i) containing more 1,4-vinyl bonds than 1,2-vinyl bonds.

More specifically, for a straight chain or branched block copolymer comprising a polybutadiene block (X) having a 1,2-vinyl bond content of 20 mol % or less (preferably, 15 mol % or less) and a polybutadiene block (Y) having a 1,2-vinyl bond content of 25 to 95 mol % (preferably, 25 to 95 mol %, and more preferably, 26 to 55 mol %), a block structure of which is represented by X—(Y—X)n or (X—Y)m (wherein n is an integer of 1 or more, and m is an integer of 2 or more), 90% or more (preferably, 95 to 100%) of butadiene polymerization units are hydrogenated, thereby being able to produce CEBC. It is preferred that CEBC obtained by such a method has a melt flow rate at 230° C. and a load of 2160 g of 0.1 to 100 g/10 min (particularly, 0.5 to 50 g/10 min).

The ratio of the crystalline polyethylene blocks in CEBC is preferably from 15 to 40% by mass based on the total amount of CEBC. When the ratio of the crystalline polyethylene blocks is less than 15% by mass, rigidity, heat resistance and surface hardness of CEBC may decrease. On the other hand, when it exceeds 40% by mass, low-temperature impact resistance may decrease.

The number average molecular weight of the block copolymer is preferably from 250,000 to 350,000, and more preferably from 280,000 to 320,000.

When the number average molecular weight of the block copolymer is less than 250,000 and the elastic member for an ink tank is a membrane valve contained in a negative pressure generating mechanism disposed in the course of an ink flow passage connecting an ink supply port for supplying ink to a recording head and an ink storage chamber, response variations of the negative pressure generating mechanism tend to occur. On the other hand, in the case of exceeding 350,000, adhesion and moldability tend to deteriorate.

1.1.2. Polyolefin Resin

The polyolefin resins include, for example, polyethylene, polypropylene, polybutene (particularly, crystalline polybutene) and the like. Isotactic polypropylene and a copolymer thereof are preferred among others.

The polyolefin resin may be a so-called modified polyolefin resin. The modified polyolefin resin is a resin in which an unsaturated polycarboxylic acid such as maleic acid or maleic anhydride, an acrylic acid compound or a hydroxyl group-containing polymerizable monomer is graft polymerized or copolymerized to the above-mentioned polyolefin resin. As such a modified polyolefin resin, there can be used, for example, a product commercially available as Nuclei Series (trade name) manufactured by Du Pont-Mitsui Polychemicals Co., Ltd., Umex Series (trade name) manufactured by Sanyo Kasei Co., Ltd., Exceller Series (trade name) manufactured by Exxon Chemical Co., Ltd., Polydone Series (trade name) manufactured by Uniroyal Co., Ltd., Admer Series (trade name) manufactured by Mitsui Chemical Industries Co., Ltd., or the like.

The ratio of the polyolefin resin based on 100 parts by weight of the block copolymer is preferably from 3 to 40 parts by weight, and more preferably from 5 to 25 parts by weight. When the above-mentioned ratio is less than 3 parts by weight, rigidity tends to deteriorate. On the other hand, when the above-mentioned ratio exceeds 40 parts by weight, core adjustability tends to deteriorate, and further, response variations tend to occur.

1.1.3. Softening Agent

As the softening agent, preferred is, for example, paraffinic oil or naphthenic oil of the mineral oil family or polyisobutylene-based oil of the synthetic oil family having a number average molecular weight of 450 to 5,000. Incidentally, the softening agents may be used either alone or as a mixture of two or more thereof as long as they have good compatibility with each other.

The ratio of the softening agent based on 100 parts by weight of the block copolymer is preferably from 40 to 250 parts by weight, and more preferably from 100 to 200 parts by weight. When the above-mentioned ratio is less than 40 parts by weight, moldability tends to deteriorate, core adjustability tends to deteriorate, and further, response variations tend to occur. On the other hand, when the above-mentioned ratio exceeds 250 parts by weight, response variations tend to occur.

1.1.4. Other Components

The elastic member for an ink tank according to this embodiment comprises a material substantially free from a petroleum hydrocarbon compound. The terminology "substantially free from a petroleum hydrocarbon compound" as used herein means that the compounding ratio of the petroleum hydrocarbon compound in the elastic member material is less than 0.1% by mass. The petroleum hydrocarbon compounds include, for example, a synthetic terpene resin, an aromatic hydrocarbon resin, an aliphatic hydrocarbon resin and the like.

Further, it is preferred that the elastic member for an ink tank according to this embodiment comprises a material substantially free from an anionic surfactant such as a salt of stearic acid. The terminology "substantially free from an anionic surfactant" as used herein means that the compounding ratio of the anionic surfactant in the elastic member material is less than 0.1% by mass. The anionic surfactants include, for example, higher fatty acids and salts thereof such as stearic acid, lauric acid, myristic acid, sodium laurate, sodium myristate, sodium stearate, potassium laurate, potassium myristate and potassium stearate. The elastic member for an ink tank according to this embodiment comprises the material substantially free from the anionic surfactant, thereby being able to prevent the generation of a coating film in forming the above-mentioned elastic member.

Furthermore, inorganic fillers such as clay, diatomaceous earth, silica, talc, barium sulfate, calcium carbonate, magnesium carbonate, a metal oxide, mica, graphite and aluminum hydroxide, various metal powders, granular or powdery solid fillers such as glass powder, ceramic powder and a granular or powdery polymer, other various natural or artificial staple fibers and filaments (various polymer fibers and the like) and the like can be incorporated into the elastic member material.

In addition, flame retardants, antimicrobial agents, hindered amine light stabilizers, UV absorbers, colorants, various tackifiers such as silicone oil, a silicone polymer, a coumarone resin, a coumarone-indene resin, a phenol terpene resin and a rosin derivative, various adhesive elastomers such as Reostomer B (trade mark: manufactured by Riken Technos Corp.) and Bondfirst (trade mark: manufactured by Sumitomo Chemical Co., Ltd.) and the like may be incorporated as other additives as needed.

1.2. Specific Examples of Elastic Members for Ink Tank 1.2.1. Specific Example 1

The elastic member for an ink tank according to this embodiment can be, for example, a membrane valve contained in a negative pressure generating mechanism disposed in the course of an ink flow passage connecting an ink supply port for supplying ink to a recording head and an ink storage chamber (Specific Example 1). The negative pressure generating mechanism as used herein is preferably a differential pressure valve. Such membrane valves include, for example, a membrane valve 212 shown in FIGS. 8 to 10 which will be described later.

The elastic member for an ink tank according to this embodiment is the above-mentioned membrane valve, and the above-mentioned membrane valve comprises the material containing 100 parts by weight of the block copolymer having the crystalline polyolefin block and the amorphous polyolefin block, 3 to 40 parts by weight of the polyolefin resin and 40 to 250 parts by weight of the softening agent, thereby being able to enhance adhesion between the membrane valve and peripheral members thereof, and being able to decrease a sliding load. This makes it possible to more smoothly supply ink to the recording head, so that response variations of the negative pressure generating mechanism (variations in ink supply capacity) can be decreased. The reason why such an effect is obtained is conceivably that the copolymer contained in the elastic member material has the crystalline polyolefin block and the amorphous polyolefin block, whereby a molecular surface of the block copolymer is smooth, caused by its molecular structure.

The hardness of the above-mentioned membrane valve is preferably from 10 to 36, and more preferably from 18 to 25. In particular, the above-mentioned membrane valve comprises the material containing 100 parts by weight of the block copolymer having the crystalline polyolefin block and the amorphous polyolefin block, 5 to 15 parts by weight of the polyolefin resin and 150 to 200 parts by weight of the softening agent, thereby being able to provide a hardness within the above-mentioned range, and to exhibit good adhesion. Incidentally, in the invention, the hardness can be measured by JIS K7215 (1986), values after HDA 15 seconds.

1.2.2. Specific Example 2

Further, the elastic member for an ink tank according to this embodiment can be, for example, a seal member attached to an ink supply port for supplying ink to a recording head (Specific Example 2). Such seal members include, for example, a seal member 252 shown FIGS. 8 to 10 which will be described later.

The elastic member for an ink tank according to this embodiment is the above-mentioned seal member, and the above-mentioned seal member comprises the material containing 100 parts by weight of the block copolymer having the crystalline polyolefin block and the amorphous polyolefin block, 3 to 40 parts by weight of the polyolefin resin and 40 to 250 parts by weight of the softening agent, thereby being excellent in ink resistance, and being able to more enhance adhesion between an ink supply needle and the seal member and core adjustability. Accordingly, leakage of the ink from the ink supply port can be surely prevented. The reason why such an effect is obtained is conceivably that the copolymer contained in the elastic member material has the crystalline polyolefin block and the amorphous polyolefin block, whereby a molecular surface of the block copolymer is smooth, caused by its molecular structure.

The hardness of the above-mentioned seal member is preferably from 25 to 55, and more preferably from 30 to 45. In particular, the above-mentioned seal member comprises the material containing 100 parts by weight of the block copolymer having the crystalline polyolefin block and the amorphous polyolefin block, 10 to 30 parts by weight of the polyolefin resin and 100 to 200 parts by weight of the softening agent, thereby being able to provide a hardness within the above-mentioned range, and to exhibit good adhesion.

1.3. Production of Elastic Member for Ink Tank

The elastic member for an ink tank according to this embodiment can be produced by a molding method of the related art such as injection molding or extrusion molding. For example, the elastic member for an ink tank according to this embodiment can be produced by melt injection molding the above-mentioned elastic member material into a mold.

1.4. Other Application Examples

The elastic member material constituting the elastic member for an ink tank according to this embodiment can also be used as another elastic member for an ink jet recording apparatus.

Examples thereof include a cap for sealing a recording head, which is a seal member provided in a main body of an ink jet recording apparatus as disclosed in JP-A-2001-225484.

1.5. Function/Effect

Before the function/effect of the elastic member for an ink tank according to this embodiment are described, elastic members for an ink jet recording apparatus of the related art will be described as a comparative reference.

1.5.1. Elastic Members for Ink Tank of Related Art

Elastic members for an ink jet recording apparatus comprising styrenic elastomers such as SEPS (a triblock copolymer of styrene-ethylene/propylene-styrene) and SEBS (a triblock copolymer of styrene-ethylene/butene-styrene) are disclosed in JP-A-2000-978 and PCT International Publication No. WO 2003/027183.

An anionic surfactant such as stearic acid is usually contained in a composition containing these styrenic elastomers. Accordingly, when the elastic member for an ink jet recording apparatus is produced by using these styrenic elastomers, a coating film of the surfactant may be generated in pouring the composition into a mold to mold the elastic member. For this reason, it takes a lot of trouble to wash the mold for removing the coating film. Further, when the elastic member for an ink jet recording apparatus is produced by using these styrenic elastomers, the temperature at the time of molding is usually required to be 200° C. or more. Moreover, the styrene block has low compatibility, so that moldability may be somewhat low.

Further, when the seal member (see FIGS. 8 and 9) is produced by using these styrenic elastomers, the resulting seal member has low adhesion.

1.5.2. Function/Effect of Elastic Member for Ink Tank According to This Embodiment Compared with this, the elastic member for an ink tank according to this embodiment comprises the elastic member material substantially free from the anionic surfactant, so that the generation of the coating film of the surfactant can be prevented. Accordingly, the trouble of mold washing or the like can be saved.

Further, the elastic member for an ink tank according to this embodiment is moldable at a lower temperature (170° C. or less), and high in oil resistance, ink resistance and fluidity and excellent in compatibility with the other components (the polyolefin resin and the like) in the elastic member material. Accordingly, it is easily molded.

Furthermore, the elastic member for an ink tank according to this embodiment comprises the material containing the copolymer having the crystalline polyolefin block and the amorphous polyolefin block, so that the molecular surface of the block copolymer is smooth, and the coefficient of static friction thereof is higher than that of the above-mentioned styrenic elastomer. This causes excellent adhesion to the other members (particularly, slide members).

2. Ink Cartridge

An ink cartridge which is an ink tank having an ink storage unit for storing ink according to one embodiment of the invention and is detachable to the ink jet recording apparatus includes the elastic member for an ink cartridge (ink tank) according to the above-mentioned embodiment. The constitution of the ink cartridge according to this embodiment will be illustrated below.

2.1. External Appearance of Ink Cartridge

FIG. 1(a), FIG. 1(b) and FIGS. 2(a) to 2(d) each shows an external appearance of an ink cartridge 161 according to one embodiment of the invention. The ink cartridge 161 is mainly constituted by a flat, rectangular, closed-end box-like container main body 162, and a cover body 163 for sealing an opening thereof. An ink supply port 164 is formed integrally with the container main body 162 so as to deflect to one side in a longitudinal direction on the leading end side of an insertion direction (a bottom surface in this embodiment). Locking members 165 and 166 are each formed integrally with the container main body 162 at upper lateral portions, respectively.

The locking member 165 located so as to deflect to the ink supply port 164 is formed so that the leading end side in the insertion direction (slightly above a lower end in this embodiment) serves as a rotation fulcrum 165a, and so that an upper portion thereof can be widened outwardly. Further, the opposite locking member 166 is formed so as to cooperate with the locking member 165 to assist the holding of the ink cartridge. These locking members 165 and 166 are constituted to have a width corresponding to the width of an insertion port provided in a carriage 260 (described later) so that side surfaces thereof serve as guide members for restricting a position in the width direction.

Further, a memory device 167 in which a plurality of electrodes 167a are formed on one surface of a board and a semiconductor memory element is formed on the other surface is provided below the locking member 165 on the side of the ink supply port 164. A valve storage chamber 168 is formed below the other locking member 166.

A slit portion 169 which extends in an insertion/removal direction of the ink cartridge 161 and at least a leading end side of which is open is formed in the vicinity of the ink supply port 164 and in a central region side of the container main body 162. This slit portion 169 is constituted so as to have such a length and a width that an opening surface of the ink supply port 164 can be restricted to be orthogonal to an ink supply needle 262, at least before the leading end of the ink supply port 164 reaches the ink supply needle 262.

2.2. Constitution and Mechanism of Carriage

Figure 3:
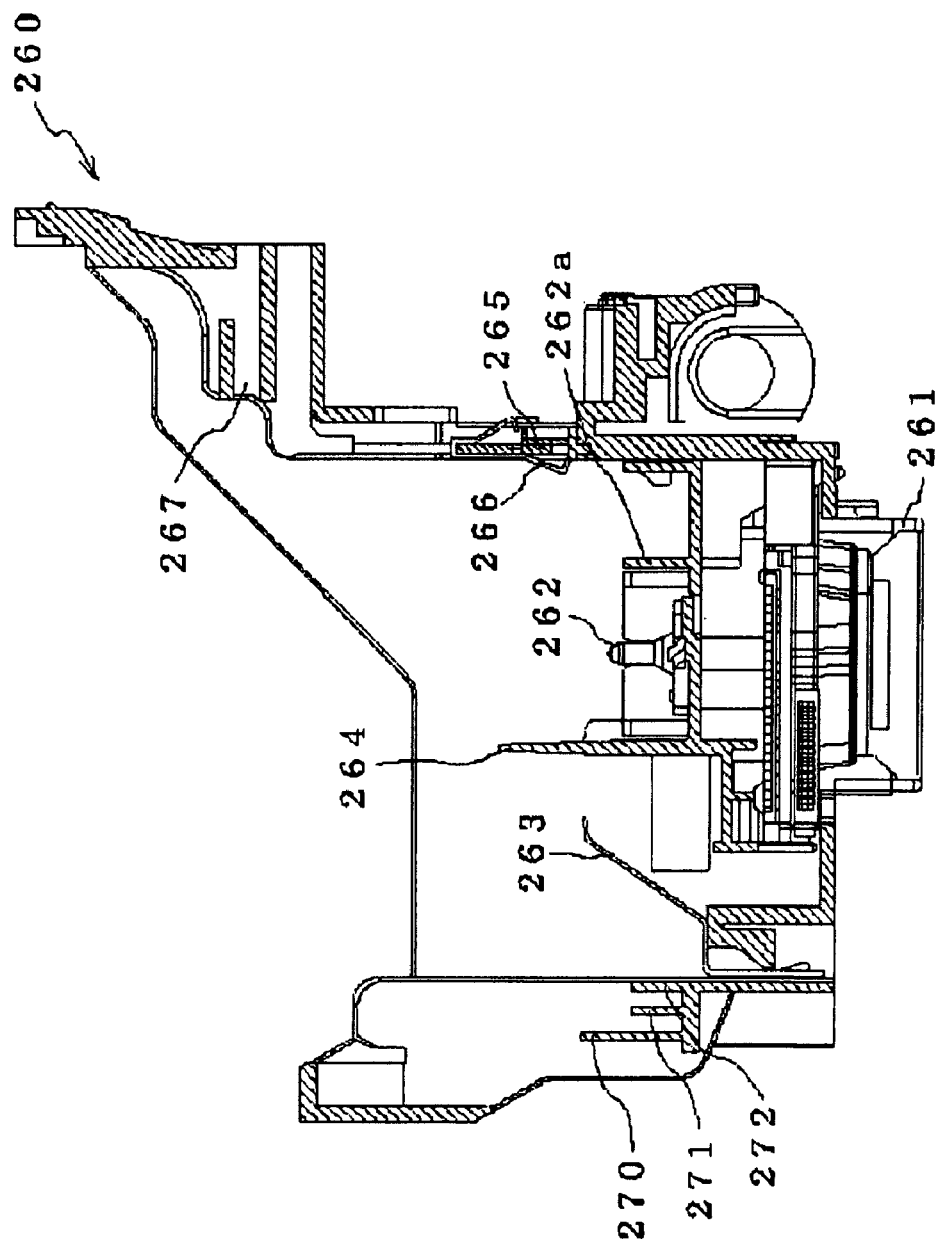
FIG. 3 is a cross-sectional view showing an example of a carriage where the ink cartridge shown in FIGS. 1(a) and 1(b) is to be mounted.

On the other hand, in the carriage 260 of an ink jet recording apparatus where the ink cartridge 161 is to be mounted, a recording head 261 is provided on a bottom surface thereof, and the ink supply needle 262 communicated with the recording head 261 is provided, as shown in FIG. 3. A pressing member (a plate spring 263 in this embodiment) is provided in a region depart from a region where the ink supply needle 262 is provided. Between it and the ink supply needle 262, a positioning protruded piece 264 is formed in a state extending in the insertion/removal direction of the ink cartridge 161. Further, electrodes 266 are disposed on a side wall 265 on the side of the ink supply needle 262. A recessed portion 267 engaged with a protrusion 165b of the locking member 165 is formed above the electrodes 266.

Figure 4:
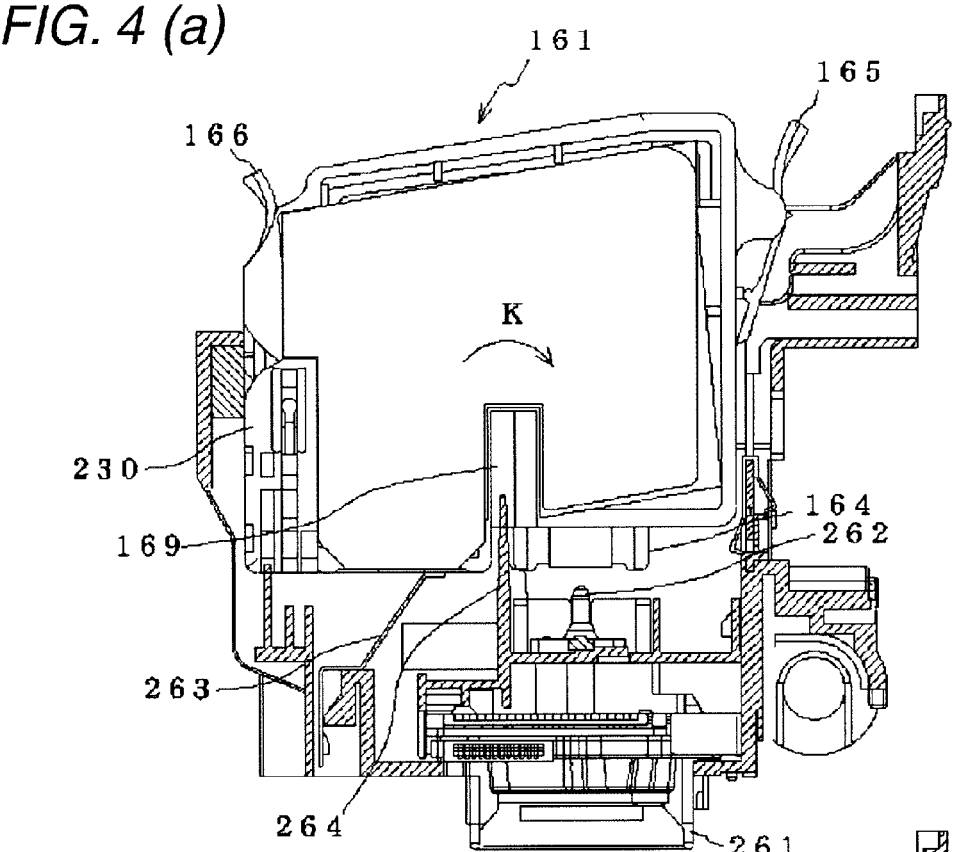
FIGS. 4(a) and 4(b) each shows a process for mounting the ink cartridge shown in FIGS. 1(a) and 1(b).
Figure 4:
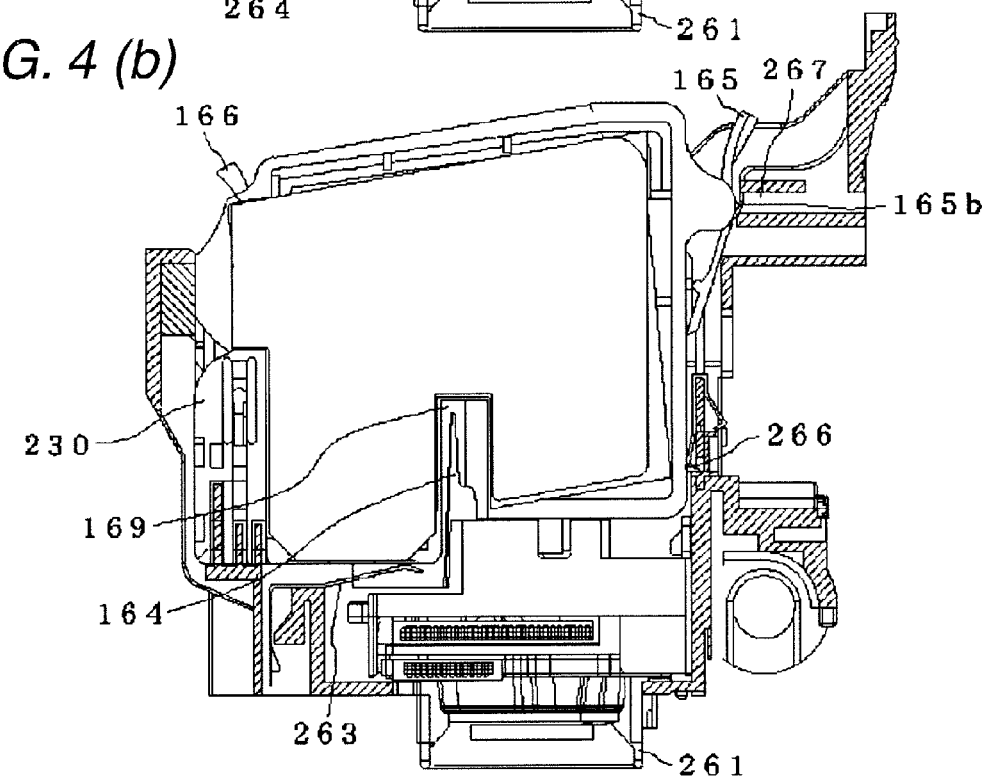

When the ink cartridge 161 is inserted against the spring 263, the protrusion 165b of the locking member 165 falls in the recessed portion 267 against the whole elasticity of the locking member 165 to be engaged therewith, as shown in FIG. 4(b).

The surface of the memory device 167 of the ink cartridge 161 where the electrodes 167a are provided is pressed onto the electrodes 266 of the carriage 260 by the urging force (the force indicated by an arrow K in the drawing) due to the spring 263 while the position of the surface in the insertion/removal direction is restricted by the protrusion 165b of the locking member 165. Accordingly, the contact can be surely maintained regardless of vibrations in printing.

Figure 5:
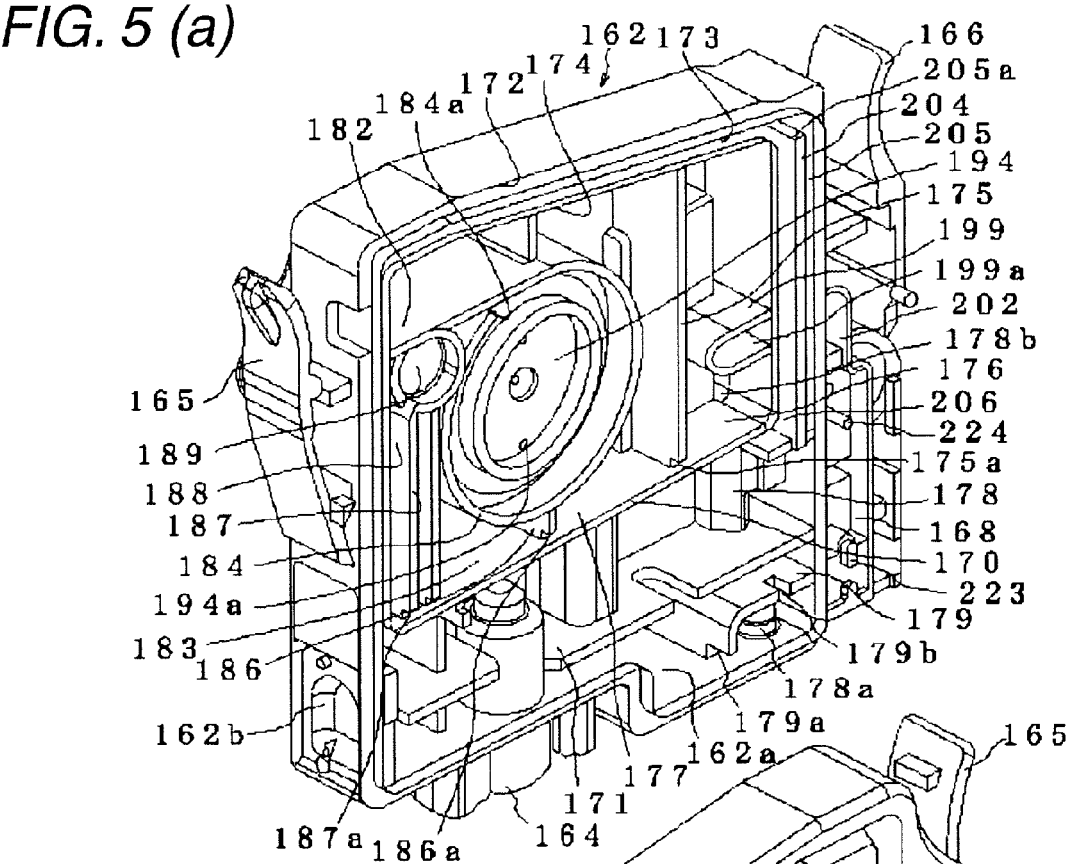
FIGS. 5(a) and 5(b) are perspective views showing one example of a main body of a container constituting the ink cartridge shown in Figs. 1(a) and 1(b) as structures of an opening face and a surface, respectively.
Figure 5:
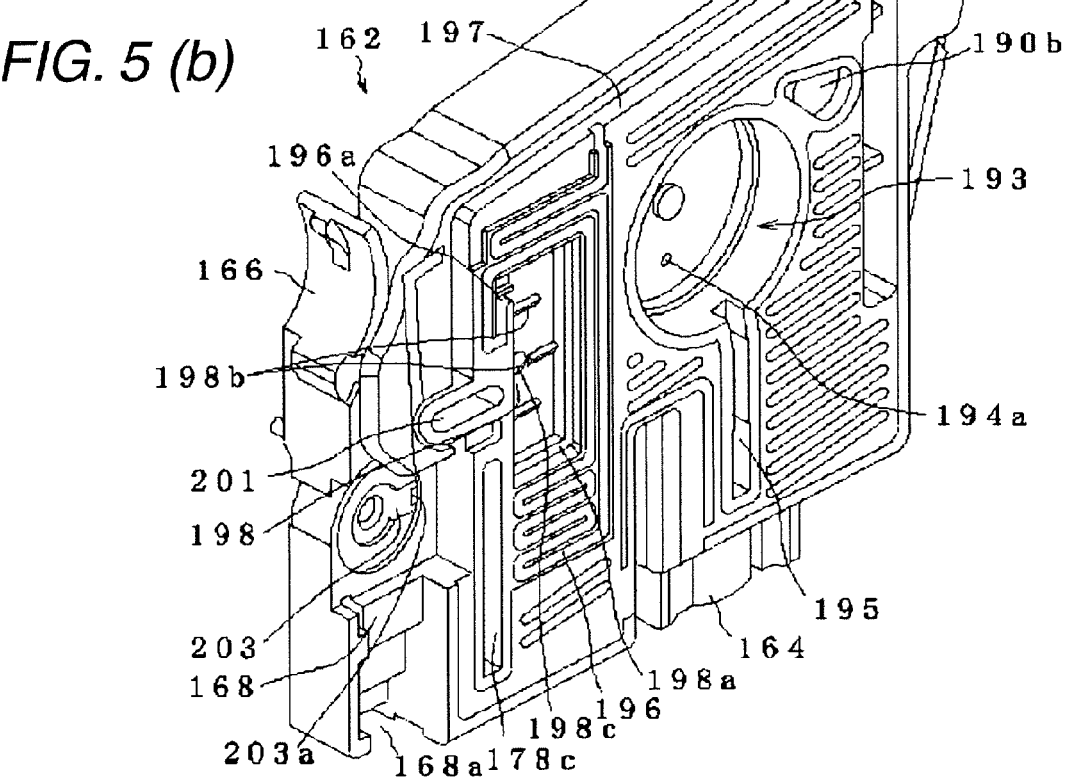

2.3. Internal Constitution of Ink Cartridge 2.3.1. Constitution of Ink Storage Chamber FIG. 5(a) and FIG. 5(b) show one example of the container main body 162 constructing the ink cartridge 161 according to this embodiment by front and rear structures. The container main body 162 is vertically divided by a wall 170 extending substantially horizontally, in more detail, extending in such a manner that the side of the ink supply port 164 is slightly lowered, in the inside of the container main body 162. A first ink storage chamber 171 is provided in a lower region of the container main body 162. An upper region of the container main body 162 is partitioned by a frame portion 174 so as to form an air communication passage 173 spaced from a wall 172 of the container main body 162 at a predetermined clearance, with the wall 170 serving as a bottom surface. The frame portion 174 is divided by a vertical wall 175 having a communication port 175a formed at its bottom portion. One region is formed as a second ink storage chamber 176, and the other region is formed as a third ink storage chamber 177.

In a region opposite to the first ink storage chamber 171, there is formed a suction flow passage 178 connecting the second ink storage chamber 176 and a bottom surface 162a of the container main body 162 (a bottom portion of the first ink storage chamber 171). The suction flow passage 178 is formed to such a cross-sectional area as to be able to correspond to the ink consumption in the recording head. A suction port 178a which is opened to the first ink storage chamber 171 and can hold ink by capillary force is formed at a lower end of the suction flow passage 178. Further, an outflow port 178b communicated with a bottom portion of the second ink storage chamber 176 is formed so as to be opened at an upper end of the suction flow passage 178.

Figure 6:
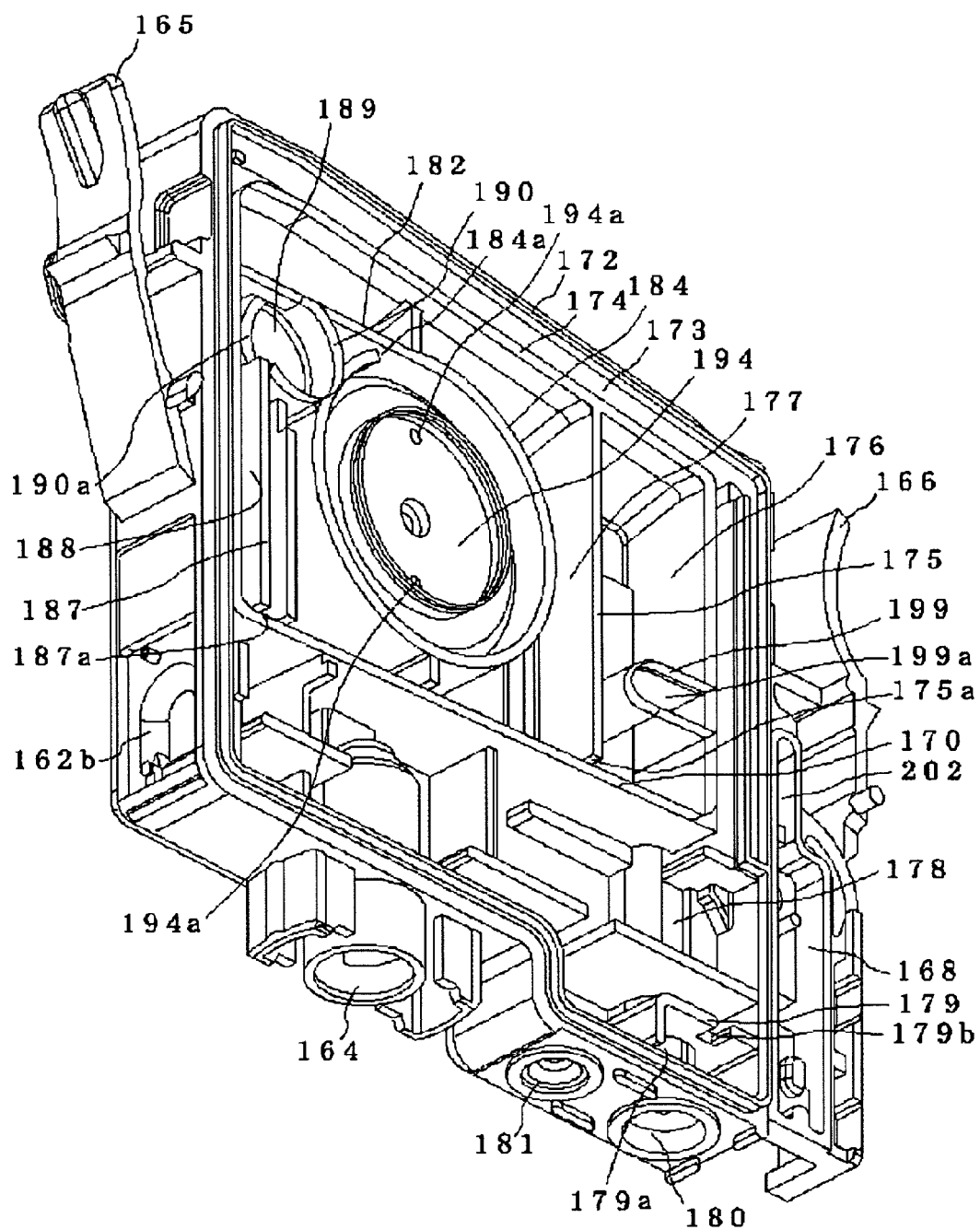
FIG. 6 is a perspective view showing a structure of a bottom surface of the main body of the container constituting the ink cartridge shown in FIGS. 1(a) and 1(b) as viewed from the opening face side.
Figure 7:
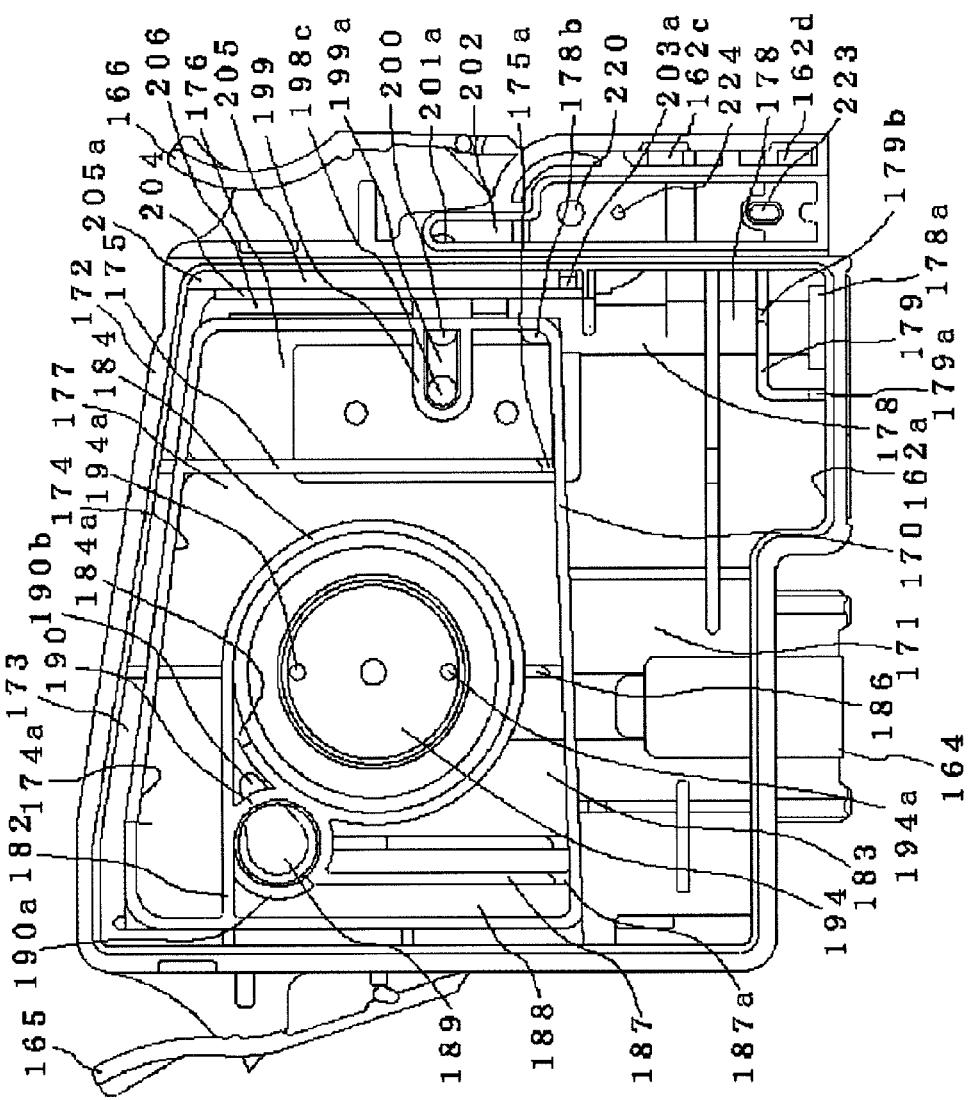
FIG. 7 is a front view showing a structure of the opening face of the main body of the container constituting the ink cartridge shown in FIGS. 1(a) and 1(b).

A wall 179 having communication ports 179a and 179b is formed in the vicinity of the suction port 178a of the suction flow passage 178. As shown in FIG. 6, an opening 180 for injecting ink from the outside into the container main body 162 and an opening 181 communicated with the first ink storage chamber 171 are formed at a position opposite to the suction flow passage 178. This suction flow passage 178 is constituted by forming a recessed portion 178c (see FIG. 5(b)) on a surface of the container main body 162, and sealing this recessed portion 178c with an air impermeable film 255 (see FIGS. 8 and 9).

The third ink storage chamber 177 is partitioned by walls 182, 184 and 186 spaced at predetermined clearances from an upper surface 174a of the frame portion 174. Further, a fourth ink storage chamber 183 is partitioned by walls 170, 184, 186 and 187. Furthermore, a flow passage continuous to the wall 182 and communicated with the back side of a differential pressure valve storage chamber 193 (see FIG. 9) is partitioned by the wall 184.

At a lower portion of the wall 184, the partition wall 186 having a communication port 186a is formed between the wall 184 and the wall 170. Further, the partition wall 187 having a communication port 187a at its lower portion is provided between the wall 184 and the frame 174 to form an ink flow passage 188. An upper portion of the ink flow passage 188 is communicated with the surface side of the cartridge 161 through a through-hole 189 serving as a filter chamber. A filter 215 (see FIG. 8) made of a porous material is inserted into this through-hole 189. Incidentally, a reference numeral 162b designates a recessed portion for containing a memory device 167, in the drawings.

As shown in FIG. 6, the through-hole 189 is separated by a wall 190 formed so as to be continuous to the wall 187, communicated with an upper end of the ink flow passage 188 through a recessed portion 190a, and communicated with a recessed portion 184a of the upper portion of the flow passage partitioned by a back side wall 194 of the differential pressure valve storage chamber 193 and the wall 184 through a water droplet-shaped recessed portion 190b on the surface side of the container main body 162.

As shown in FIG. 5(b), a lower portion of the differential pressure valve storage chamber 193 and the ink supply port 164 are connected to each other by a flow passage comprising a recessed portion 195 formed on the surface of the container main body 162 and the air impermeable film 255 covering the recessed portion 195.

Further, a narrow groove 196 which meanders so as to increase the flow resistance as high as possible is formed on the surface of the container main body 162, and a wide groove 197 is formed around the narrow groove 196. A rectangular recessed portion 198 is formed in a region opposite to the second ink storage chamber 176.

In the rectangular recessed portion 198, a frame 198a and ribs 198b disposed separately are formed in a further lowered position. An air permeable film 258 (see FIG. 9) having ink repellency and air permeability is provided in a stretched state so as to be fixed by this frame 198a, thereby forming an air communication chamber by partition.

A through-hole 198c is formed in a bottom surface of the recessed portion 198, and communicated with an elongated region 199a (see FIG. 5(a)) partitioned by a wall 199 of the second ink storage chamber 176. Further, one end 196a of the narrow groove 196 is communicated with a region of the recessed portion 198, which is closer to the surface side than to the air permeable film 258. The other end of the region 199a is communicated with a valve storage chamber 168 through a through-hole 200 formed herein, a groove 201 formed on the surface of the container main body 162 and a through-hole 201a.

On the other hand, a recessed portion 203 is formed on the back side of the valve storage chamber 168, and a through-hole 203a opened in the vicinity of the second ink storage chamber 176 is formed at a leading end of the valve storage chamber 168. A region from the recessed portion 203 to the through-hole 203a is sealed with a film 221 to form a flow passage for air communication. This through-hole 203a is communicated with a flow passage 205 partitioned by a vertically extending wall 204 formed at a predetermined clearance from the frame 174 and the cover body 163. An upper end 205a of the flow passage 205 is communicated with an upper end of the first ink storage chamber 171 through a flow passage 206 formed by the wall 204 and the frame 174 or through the air communication passage 173.

The leading end of the valve storage chamber 168 on the insertion side is opened (by a lower window 168a as shown in FIG. 5(b), in this embodiment). A plurality of identification pieces 270, 271 and 272 (see FIG. 3) provided on the carriage 160 of the recording apparatus main body and an identification block 230 into which a valve operation rod can go, which is described later, are mounted on a lower portion thereof, and an air open valve 225 is mounted on an upper portion thereof.

2.3.2. Constitution of Differential Pressure Valve and Ink Supply Port

Figure 8:
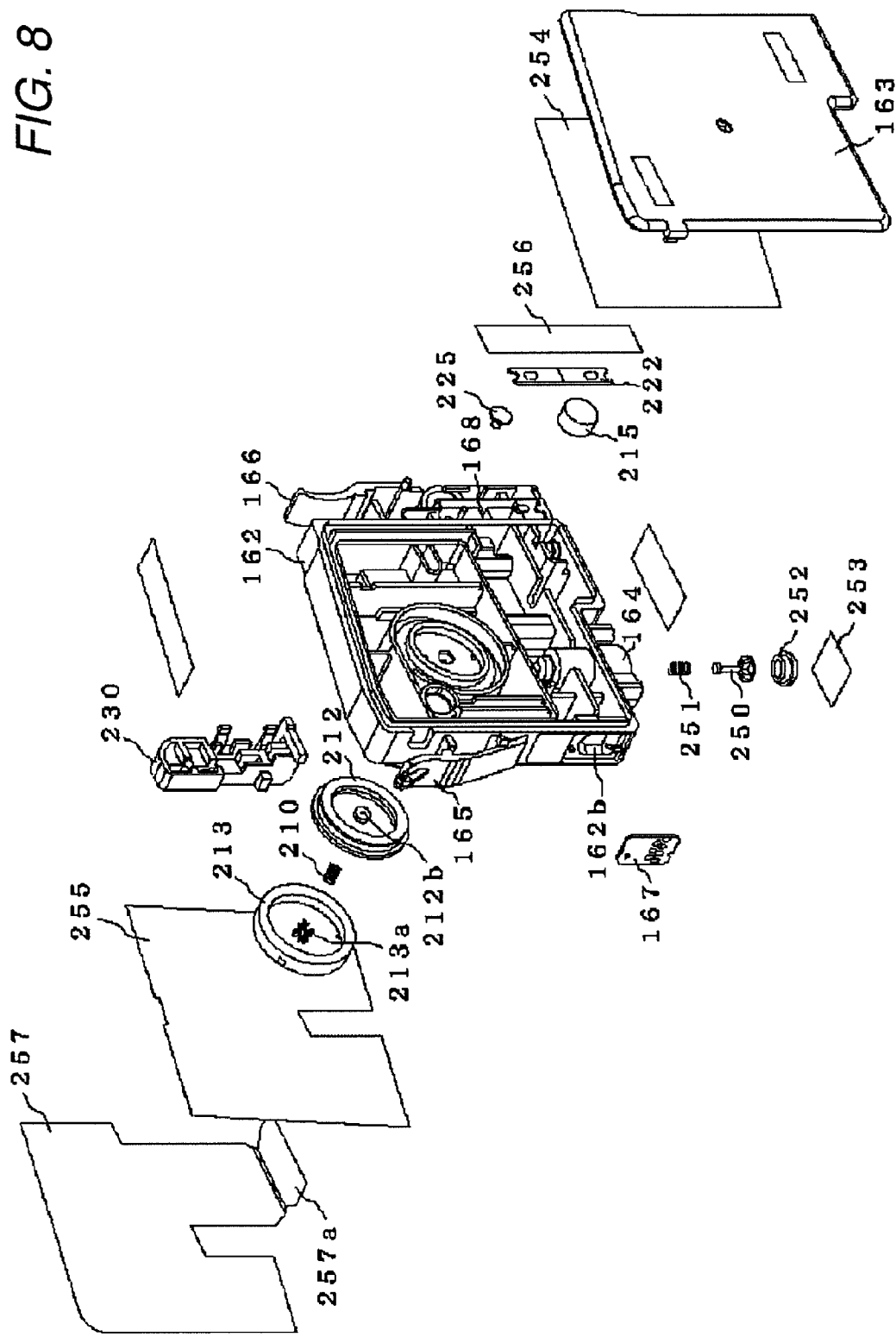
FIG. 8 is an exploded perspective view showing the ink cartridge shown in FIGS. 1(a) and 1(b).

As shown in FIG. 8, a film 254 is bonded to the frame 174 and the walls 170, 175, 182, 184, 186, 187, 190 and 199 on the opening side of the container main body 162 by thermal welding or the like to form the ink storage chambers (176, 177 and 183) in the upper portion, and the cover body 163 is hermetically fitted in a state separated from the lower ink storage chamber (171). Further, a film 256 is bonded to the valve storage chamber 168 in a state where the valve body 225 and a plate spring 222 are contained therein.

Figure 9:
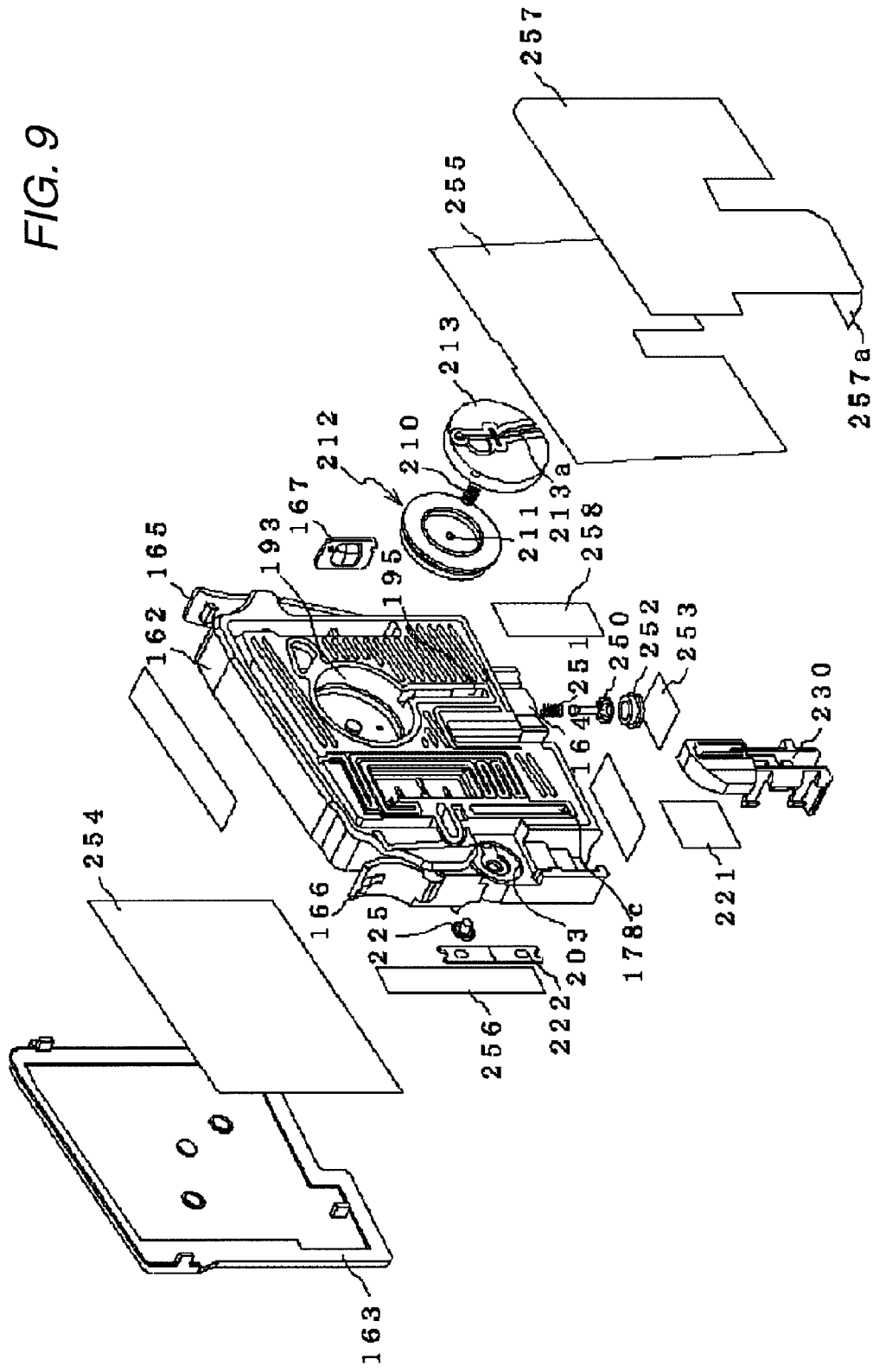
FIG. 9 is an exploded perspective view showing the ink cartridge shown in FIGS. 1(a) and 1(b).

On the other hand, as shown in FIG. 9, the membrane valve 212, a spring 210 and a membrane valve holding plate 213 having a groove 213a for communicating the outlet side of the membrane valve 212 with the recessed portion 195 are mounted in the differential pressure valve storage chamber 193, and then a sheet of the air impermeable film 255 having such a size that the differential pressure valve storage chamber 193, the narrow groove 196, the groove 201, the recessed portion 190b, the recessed portion 195, the recessed portion 198 and the recessed portion 178c can be covered is bonded to the surface side of the container main body 162. Further, the film 221 having air permeability and easily elastically deformable by the operation rod is bonded to a region opposite to the recessed portion 203 of the valve storage chamber 168, and the identification piece 230 is mounted and fixed to the surface side thereof by pawls 230a and 230b.

Further, the ink supply port 164 constituted by inserting a valve body 250 opened by the insertion of the ink supply needle (see FIG. 3) and a seal member 252 for ensuring adhesion between the ink supply needle 262 (see FIG. 3) and the container main body 162, with the valve body 250 normally closed by a spring 251 (inserted so as to be pressed downward in this embodiment). Specifically, the seal member 252 is preferably formed of the material according to the above-mentioned embodiment.

Incidentally, in FIG. 8, reference numeral 253 designates a film for protection which is bonded to the ink supply port 164 to prevent leakage of ink during a distribution process and permits the insertion of the ink supply needle 262.

Figure 10:
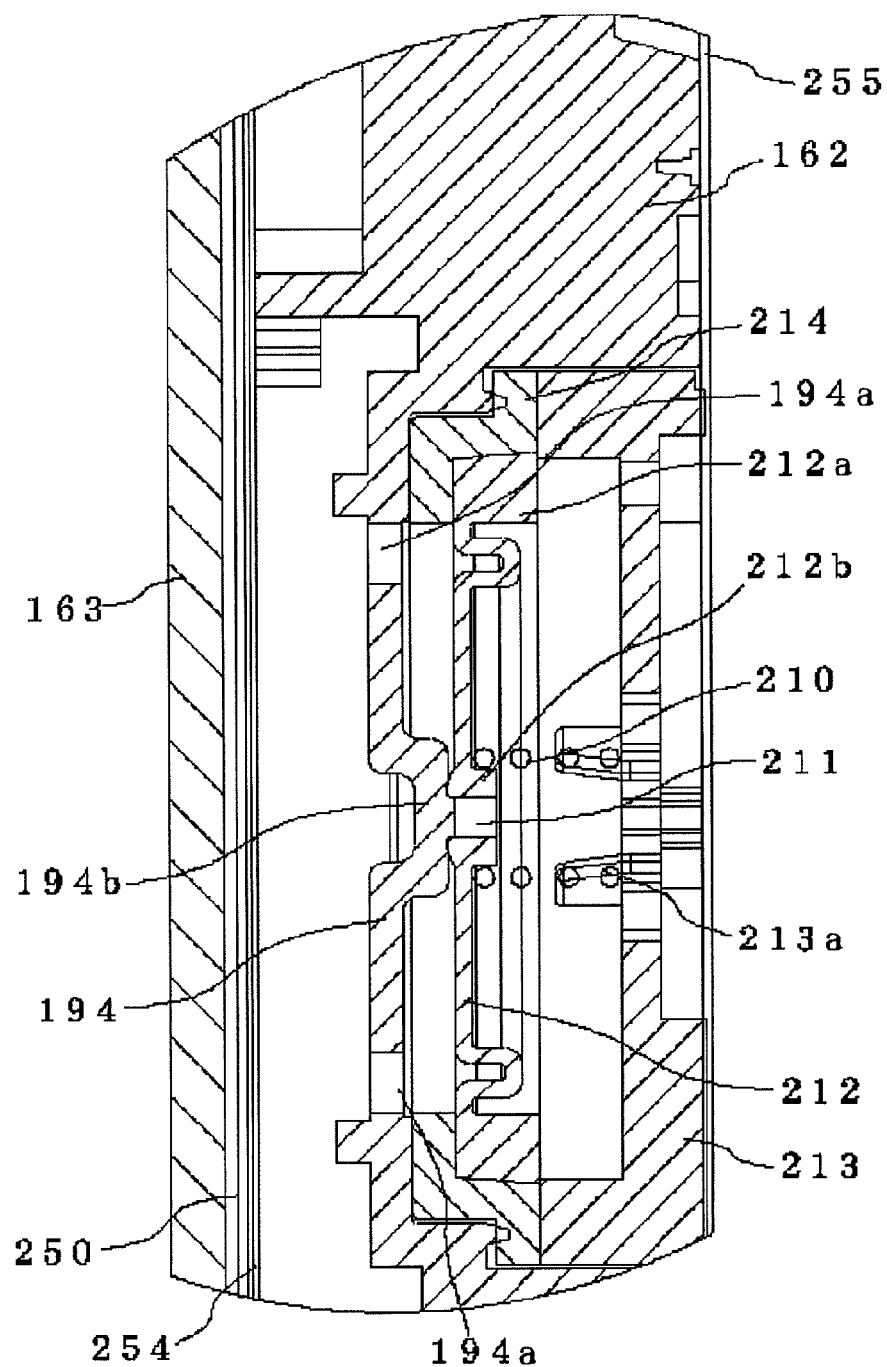
FIG. 10 is an enlarged cross-sectional view showing a structure in the vicinity of a differential pressure valve storage chamber.

FIG. 10 shows a cross-sectional structure in the vicinity of the differential pressure valve storage chamber 193. As shown in FIG. 10, the spring 210 and the membrane valve 212 having a through-hole 211 at a center thereof are contained in the differential pressure valve storage chamber 193.

The membrane valve 212 has an annular thick portion 212a circumferentially provided and a frame portion 214 formed integrally with this annular thick portion 212a, and is fixed to the container main body 162 through this frame portion 214. The membrane valve 212 is formed of an elastically deformable material, and specifically, it is preferably formed of the material according to the above-mentioned embodiment.

Further, the spring 210 is supported at one end by a spring receiving portion 212b of the membrane valve 212, and at the other end by the membrane valve holding plate 213 fittingly fixed to the container main body 162.

By such constitution, ink which has passed through the filter 215 passes through ink flow ports 194a and is blocked by the membrane valve 212. In this state, when the pressure of the ink supply port 164 decreases, the membrane valve 212 is separated from a valve seat portion 194b against the urging force of the spring 210, so that the ink passes through the through-hole 211 and flows in the ink supply port 164 through a flow passage formed by the recessed portion 194.

When the ink pressure of the ink supply port 164 increases to a predetermined valve, the membrane valve 212 is elastically brought into contact with the valve seat 194b, yielding to the urging force of the spring 210, resulting in interception of the ink flow. By repeating such an operation, the ink can be discharged to the ink supply port 164 while maintaining a constant negative pressure.

3. Examples

The invention will be described more specifically below with reference to examples, but the invention should not be construed as being limited to these examples. Incidentally, in these examples, % and parts are on weight basis.

3.1. Production Examples of Seal Members

Using components shown in Table 1, seal members 212 (see FIG. 8 and FIG. 9) of Examples 1 to 5 and Comparative Examples 1 to 7 were produced by melt injection molding. CEBC used as a block copolymer in Examples 1 to 5 and Comparative Examples 1 to 4 was "DR 6200" (trade name) manufactured by JSR Corporation, SEPS (comparison) used in Comparative Examples 5 and 7 was "SEPS 4055" manufactured by Kuraray Co., Ltd., and SIBS (styrene-isobutene/butene-styrene) (comparison) used in Comparative Example 6 was "073T" (trade name) manufactured by Kaneka Corporation.

Further, "PM 900A" (trade name) manufactured by SunAllomer Ltd. was used as a polyolefin resin, pp (polypropylene), and "PW-90" manufactured by Idemitsu Kosan Co., Ltd. was used as a softening agent.

Incidentally, a petroleum hydrocarbon compound used in Comparative Example 7 was "Endex 155" manufactured by Eastman Chemical Company.

TABLE 1

| | Polymer | Polyolefin Resin | Softening Agent | Petroleum Hydrocarbon Compound | Hardness (HDA) |
|---|---|---|---|---|---|
| Example 1 | 100 | 3 | 90 | — | 36 |
| Example 2 | 100 | 40 | 250 | — | 24 |
| Example 3 | 100 | 10 | 200 | — | 20 |
| Example 4 | 100 | 5 | 200 | — | 18 |
| Example 5 | 100 | 15 | 180 | — | 25 |
| Comp. Ex. 1 | 100 | 45 | 250 | — | 26 |
| Comp. Ex. 2 | 100 | 1 | 200 | — | 16 |
| Comp. Ex. 3 | 100 | 20 | 280 | — | 10 |
| Comp. Ex. 4 | 100 | 2 | 80 | — | 37 |
| Comp. Ex. 5 | 100 (Comparison) | 10 | 200 | — | 20 |
| Comp. Ex. 6 | 100 (Comparison) | 10 | 200 | — | 5 |
| Comp. Ex. 7 | 100 (Comparison) | 10 | 200 | 10 | 22 |

3.2. Evaluation of Seal Members

Then, for the seal members 212 produced in Examples and Comparative Examples, evaluation was made. The results thereof are shown below.

3.2.1. Core Adjustability

Each of the seal members produced in Examples 1 to 5 and Comparative Examples 1 to 7 was attached to the ink supply port 164 of the ink cartridge 161 (see FIG. 8 and FIG. 9), and then, held at 60° C. for 5 days in a state where the ink cartridge 161 was attached to the carriage 260 (see FIG. 3). Thereafter, the seal member and the ink supply needle 262 were shifted, and the ink supply needle 262 was inserted in the ink supply port 164. A tube was inserted on the ink supply needle 262 and allowed to hang down just below. Water was injected in that tube to apply a pressure of about −10 kg/Pa, and the shift length of the ink supply needle 262 in that state was measured. It can be said that the larger the shift length, the better the core adjustability between the seal member and the ink supply needle 262.

As a result, the seal members (average of 5 samples) obtained in Examples 1 to 5 have an average shift length of 1.16 mm and a maximum shift value of 1.5 mm, whereas the seal members (average of 5 samples) obtained in Comparative Examples 1 to 7 have an average shift length of 1.12 mm and a maximum shift value of 1.27 mm.

From the above results, it can be understood that the seal members obtained in Examples have better core adjustability than the seal members obtained in Comparative Examples.

3.2.2. Adhesion (Tackiness)

Each of the seal members produced in Examples 1 to 5 and Comparative Examples 1 to 7 was attached to the ink supply port 164 of the ink cartridge 161 (see FIG. 8 and FIG. 9), and then, held at 60° C. for 5 days in a state where the ink cartridge 161 was attached to the carriage 260 (see FIG. 3). Thereafter, the load (detaching force) at the time when the ink supply needle 262 was detached from the seal member was measured. Incidentally, the measurement was made in a state where the spring 251 was not attached to the ink supply port 164. It can be said that the larger the load, the more difficult for the seal member to come off from the ink supply needle 262, resulting in better adhesion.

As a result, the seal members (average of 3 samples) obtained in Examples have an average deaerating force of 4.0 N, whereas the seal members (average of 5 samples) obtained in Comparative Examples have an average load of 6.36 N.

From the above results, it can be understood that the seal members obtained in Examples have better adhesion than the seal members obtained in Comparative Examples.

3.3. Production Examples of Membrane Valves

Using components shown in Table 2, membrane valves 212 (see FIG. 8 to FIG. 10) of examples 6 to 11 and Comparative Examples 8 to 14 were produced by melt injection molding. CEBC used as a block copolymer in Examples 6 to 11 and Comparative Examples 8 to 11 was "DR 6200" (trade name) manufactured by JSR Corporation, SEPS (comparison) used in Comparative Examples 12 and 13 was "SEPS 4055" manufactured by Kuraray Co., Ltd., and SIBS (styrene-isobutene/butane-styrene) (comparison) used in Comparative Example 14 was "073T" (trade name) manufactured by Kaneka Corporation.

Further, "PM 900A" (trade name) manufactured by SunAllomer Ltd. was used as a polyolefin resin, pp (polypropylene), and "PW-90" manufactured by Idemitsu Kosan Co., Ltd. was used as a softening agent.

Incidentally, a petroleum hydrocarbon compound used in Comparative Example 14 was "Endex 155" manufactured by Eastman Chemical Company.

TABLE 2

| | Polymer | Polyolefin Resin | Softening Agent | Petroleum Hydrocarbon Compound | Hardness (HDA) |
|---|---|---|---|---|---|
| Example 6 | 100 | 3 | 40 | — | 44 |
| Example 7 | 100 | 40 | 250 | — | 25 |
| Example 8 | 100 | 15 | 100 | — | 40 |
| Example 9 | 100 | 10 | 100 | — | 35 |
| Example 10 | 100 | 25 | 100 | — | 45 |
| Example 11 | 100 | 30 | 180 | — | 31 |
| Comp. Ex. 8 | 100 | 45 | 250 | — | 26 |
| Comp. Ex. 9 | 100 | 1 | 220 | — | 13 |
| Comp. Ex. 10 | 100 | 40 | 260 | — | 22 |
| Comp. Ex. 11 | 100 | 3 | 30 | — | 46 |
| Comp. Ex. 12 | 100 (Comparison) | 15 | 100 | — | 30 |
| Comp. Ex. 13 | 100 (Comparison) | 15 | 100 | — | 20 |
| Comp. Ex. 14 | 100 (Comparison) | 15 | 100 | 10 | 32 |

3.4. Evaluation of Membrane Valves

According to the membrane valves of Examples 6 to 11, adhesion between each of the membrane valves and peripheral members thereof could be enhanced, and sliding load could be decreases. Compared with this, according to the membrane valves of Comparative Examples 8 to 14, adhesion between each of the membrane valves and peripheral members thereof was low, and sliding load was high.

The elastic member for an ink jet recording apparatus and the elastic member for an ink tank according to one embodiment of the invention comprise the material containing 100 parts by weight of the block copolymer having the crystalline polyolefin block and the amorphous polyolefin block, 3 to 40 parts by weight of the polyolefin resin and 40 to 250 parts by weight of the softening agent, thereby being excellent in ink resistance, adhesion and moldability.

For example, when the elastic member for an ink tank is the membrane valve contained in the negative pressure generating mechanism disposed in the course of the ink flow passage connecting the ink supply port for supplying the ink to the recording head and the ink storage chamber, the elastic member comprises the above-mentioned material, thereby being able to enhance adhesion between the membrane valve and peripheral members thereof. This makes it possible to more smoothly supply the ink to the recording head, so that response variations of the negative pressure generating mechanism (variations in ink supply capacity) can be decreased.

Further, for example, when the elastic member for an ink tank is the seal member provided in the ink supply port for supplying the ink to the recording head, the elastic member comprises the above-mentioned material, thereby being excellent in ink resistance, and being able to more enhance adhesion and core adjustability between the ink supply needle and the seal member. Accordingly, leakage of the ink from the ink supply port can be surely prevented.

The invention is not limited to the above-mentioned embodiments, and various modifications are possible. For example, the invention includes the substantially same constitution as described in the embodiments (for example, the constitution having the same function, manner and results or the constitution having the same object and results). Further, the invention includes a constitution in which a nonessential portion of the constitution described in the embodiments is replaced. Furthermore, the invention includes a constitution which exerts the same function and effect as in the constitution described in the embodiments or a constitution which can achieve the same object as in the constitution described in the embodiments. In addition, the invention includes a constitution in which the related art is added to the constitution described in the embodiments.

What is claimed is:

1. An elastic member for an ink jet recording apparatus comprising a material containing 100 parts by weight of a block copolymer having two crystalline polyolefin blocks and an amorphous polyolefin block, 3 to 40 parts by weight of a polyolefin resin and 40 to 250 parts by weight of a softening agent wherein the block copolymer is CEBC, the two crystalline polyolefin blocks are crystalline polyethylene blocks, and the amorphous polyolefin block is an amorphous polyethylene/butene alternate copolymer block.

2. The elastic member for an ink jet recording apparatus according to claim 1, which is a seal member to be provided in a main body of the ink jet recording apparatus.

3. The elastic member for an ink jet recording apparatus according to claim 2, wherein the seal member is a cap member for sealing a recording head of the ink jet recording apparatus.

4. An ink jet recording apparatus comprising the elastic member for an ink jet recording apparatus according to claim 1.

5. An elastic member for an ink tank comprising a material containing 100 parts by weight of a CEBC block copolymer having at two crystalline polyolefin blocks, each crystalline polyolefin block comprising a polyethylene block, and an amorphous polyolefin block comprising a polyethylene/butene alternate copolymer block, 3 to 40 parts by weight of a polyolefin resin and 40 to 250 parts by weight of a softening agent.

6. The elastic member for an ink tank according to claim 5, wherein the block copolymer has a number average molecular weight of 250,000 to 350,000.

7. The elastic member for an ink tank according to claim 5, wherein the elastic member is a membrane valve.

8. The elastic member for an ink tank according to claim 7, wherein the membrane valve is a differential pressure valve.

9. The elastic member for an ink tank according to claim 5, which is a seal member to be provided in an ink supply port for supplying ink to a recording head.

10. An ink tank comprising the elastic member according to claim 5.

11. The elastic member for an ink tank according to claim 5, wherein the CEBC block copolymer is produced by hydrogenating a triblock copolymer containing a polybutadiene block containing more 1,4-vinyl bonds than 1,2-vinyl bonds, a polybutadiene block containing more 1,2-vinyl bonds than 1,4-vinyl bonds, and a polybutadiene block containing more 1,4-vinyl bonds than 1,2-vinyl bonds.

* * * * *